INVENTORS
Forrest M. Bird
Henry L. Pohndorf
BY
Attorneys

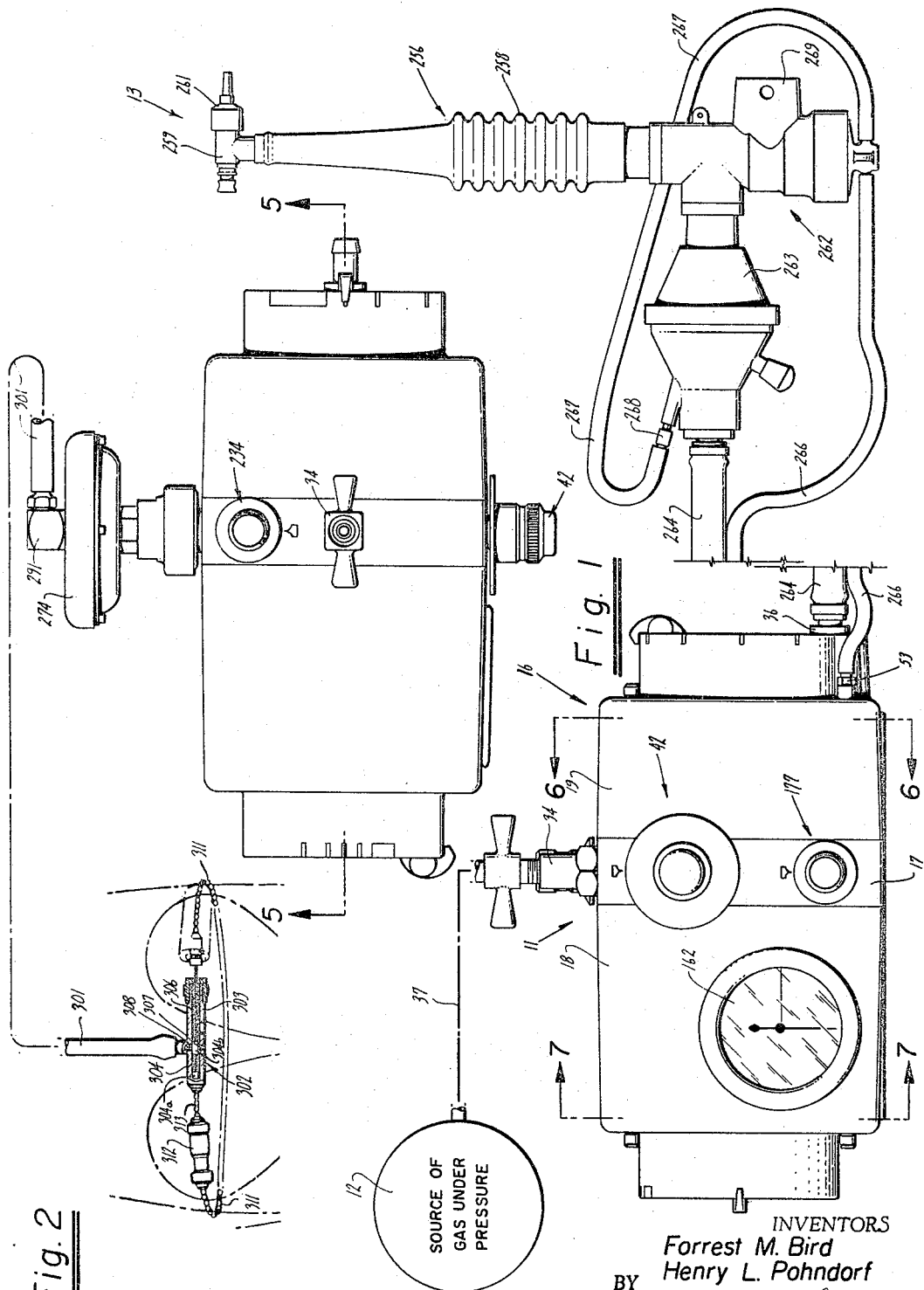

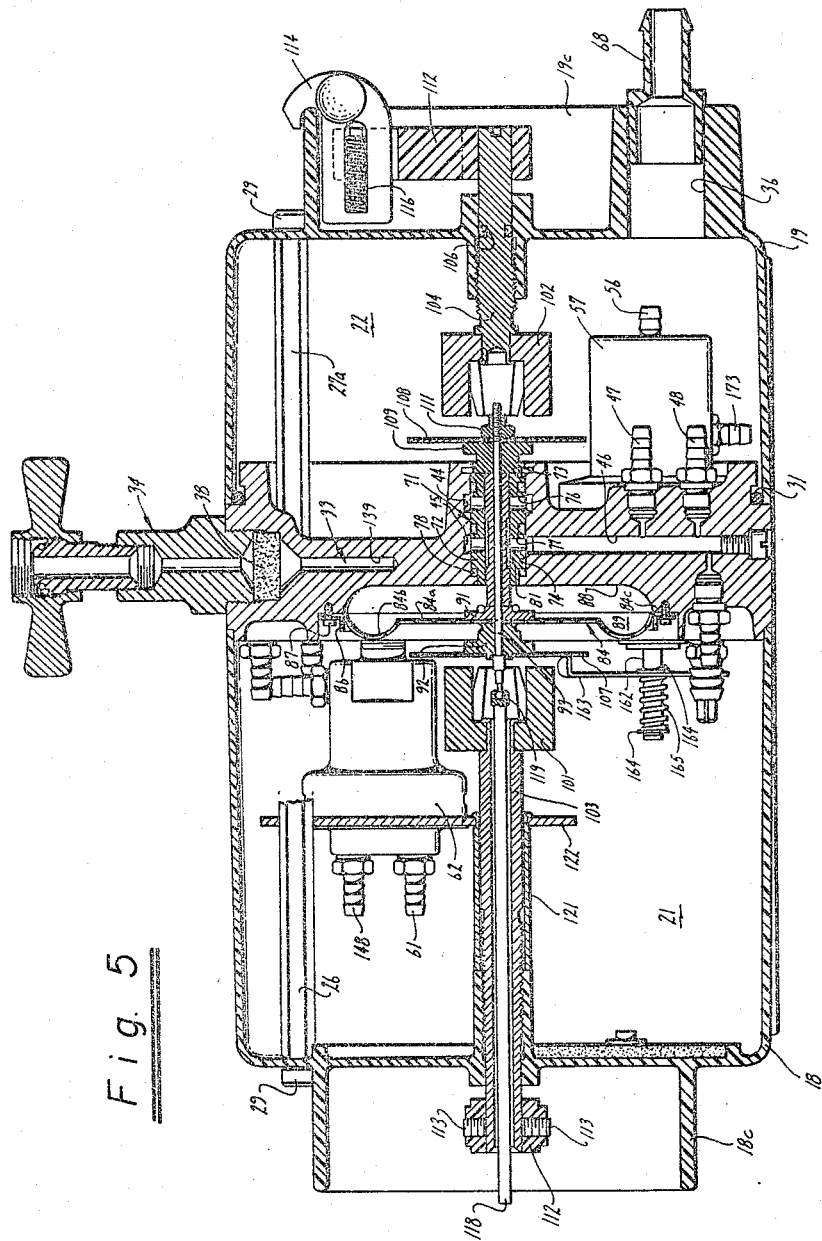

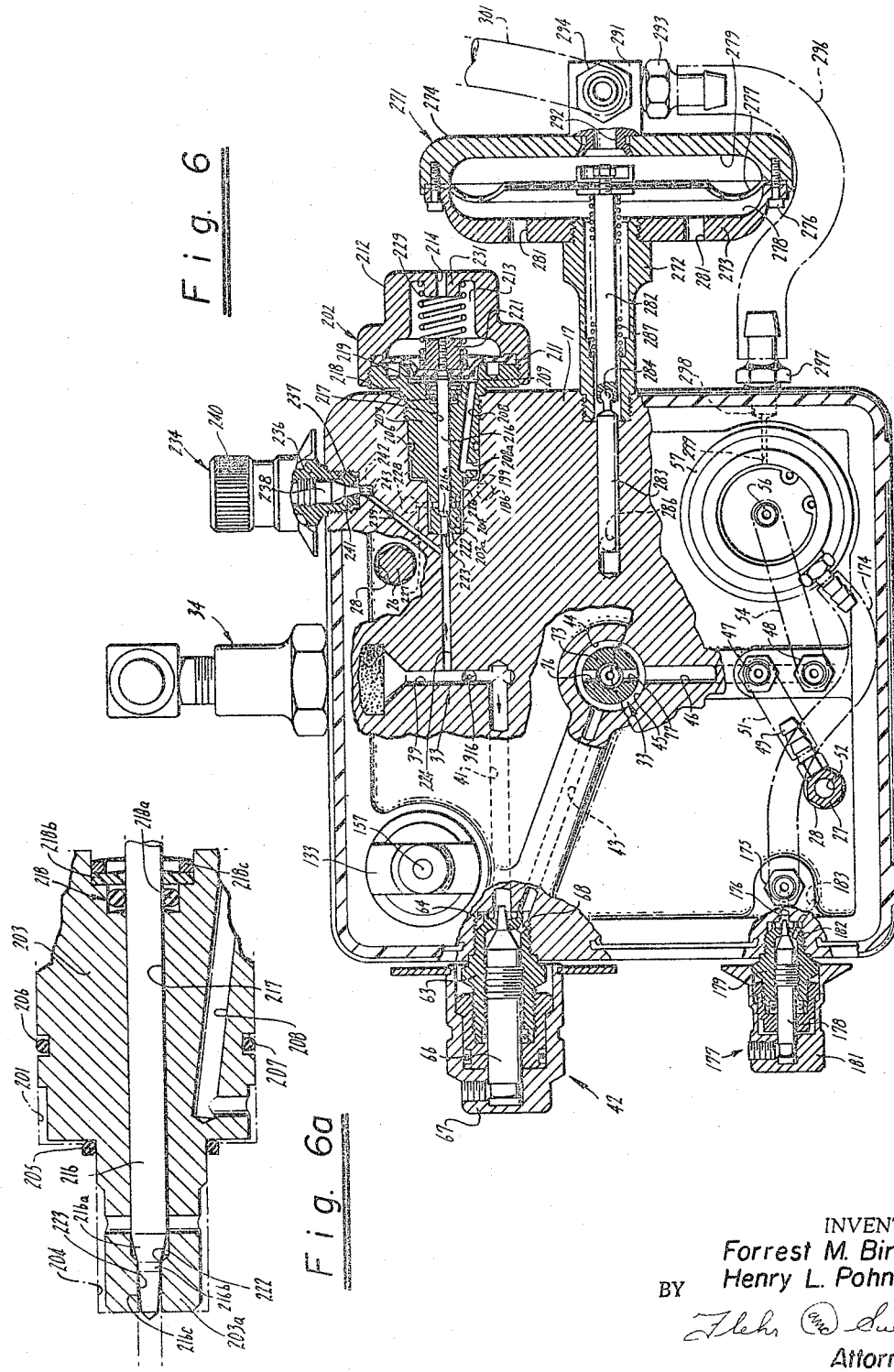

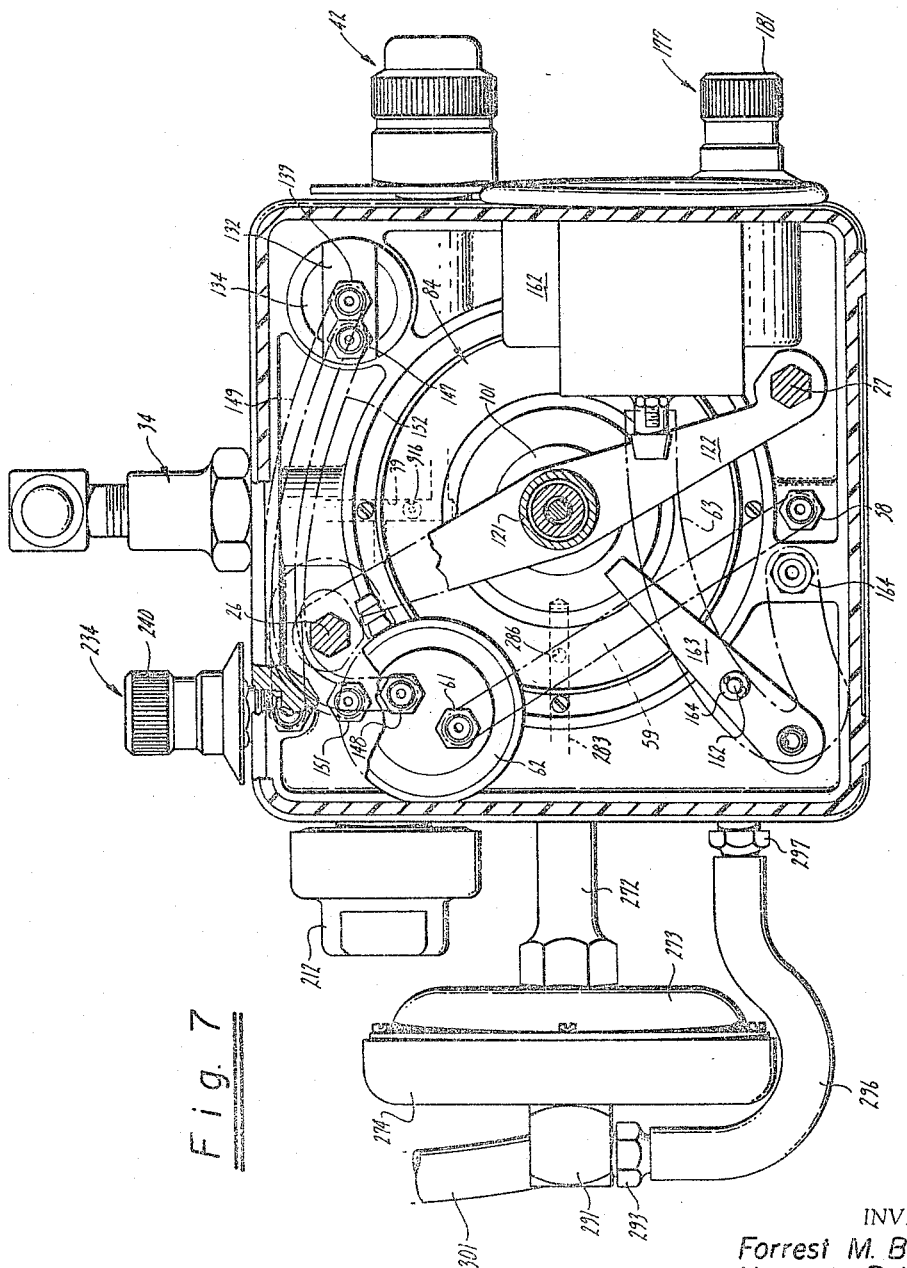

July 18, 1967    F. M. BIRD ETAL    3,331,368
PRESSURE AND VOLUME LIMITING VENTILATING APPARATUS
Filed March 24, 1965    6 Sheets-Sheet 6

INVENTORS
Forrest M. Bird
Henry L. Pohndorf
BY
Attorneys

United States Patent Office 3,331,368
Patented July 18, 1967

3,331,368
PRESSURE AND VOLUME LIMITING
VENTILATING APPARATUS
Forrest M. Bird, 212 NW. Cerritos, Palm Springs, Calif. 92262, and Henry L. Pohndorf, 1227 Brewster Drive, El Cerrito, Calif. 94530
Filed Mar. 24, 1965, Ser. No. 442,310
11 Claims. (Cl. 128—145.8)

This invention relates to a ventilating apparatus and more particularly to a pressure and volume limiting ventilating apparatus.

In U.S. Letters Patent 3,068,856, there is disclosed a fluid control device and in an application for U.S. patent Ser. No. 57,062, filed on Sept. 19, 1960, now Patent No. 3,191,596, there is disclosed a respirator. In the respirator particularly, certain of the assemblies incorporated therein have given some difficulty. For example, the accelerator cartridge assembly acted as a dam for gas molecules constantly coming from a metering valve assembly during the expiratory phase when the main control valve was in the off position. The effect of this dam was to create a reservoir of gas molecules under pressure in the spaces between the dam and the metering valve assembly. It has been found that the number of gas molecules accumulating in the reservoir during the expiratory phase and during the duration of the pause before initiating the inspiratory or inhalation phase for opening of the main control valve varied considerably because of large variations in the expiratory phase and the duration of the pause from breath to breath of the patient. In fact, this reservoir of gas molecules acted as a preload which was dependent on a variable time and also dependent upon variable pressures upstream from the metering valve assembly. Certain difficulties were also encountered with the accelerator-interruptor cartridge. There is, therefore, a need for a new and improved apparatus of this type.

In general, it is an object of the present invention to provide a pressure and volume limiting ventilating apparatus which overcomes the above named disadvantages.

Another object of the invention is to provide a ventilating apparatus of the above character which makes it possible to compensate for variable leaks in the apparatus and in the connections made to the patient's airway and when notable changes occur in pulmonary compliance and resistance.

Another object of the invention is to provide a ventilating apparatus of the above character in which there is improved cooperation between the various parts.

Another object of the invention is to provide a ventilating apparatus of the above character which has a particularly novel automatic flow accelerator cartridge assembly.

Another object of the invention is to provide a ventilating apparatus of the above character which has a particularly novel accelerator interruptor cartridge.

Additional objects and features of the invention will appear from the following description in which the preferred embodiment is set forth in detail in conjunction with the accompanying drawings.

Referring to the drawings:

FIGURE 1 is a front elevational view of a volume limiting ventilating apparatus incorporating the present invention.

FIGURE 2 is a top plan view of the apparatus shown in FIGURE 1 without the hoses or tubes connecting the outlet to the patient adapter.

FIGURE 5 is a cross-sectional view taken along the line 5—5 of FIGURE 2.

FIGURE 6 is a cross-sectional view taken along the line 6—6 of FIGURE 1.

FIGURE 6A is an enlarged detail view in cross-section of the automatic flow accelerator cartridge.

FIGURE 7 is a cross-sectional view taken along the line 7—7 of FIGURE 1.

Figure 3:
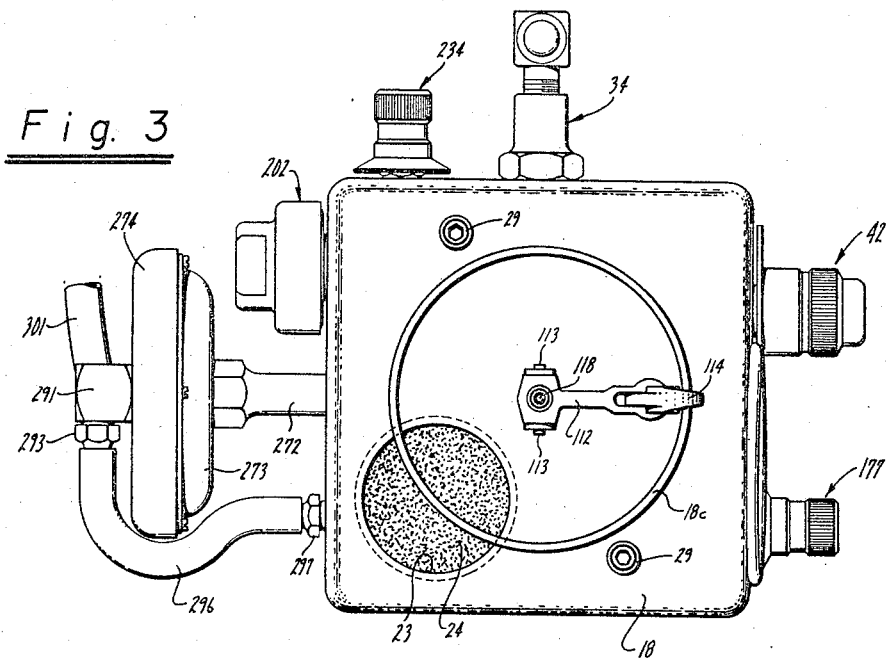
FIGURE 3 is an end elevational view of the left-hand end of the apparatus as viewed in FIGURE 2.
Figure 4:
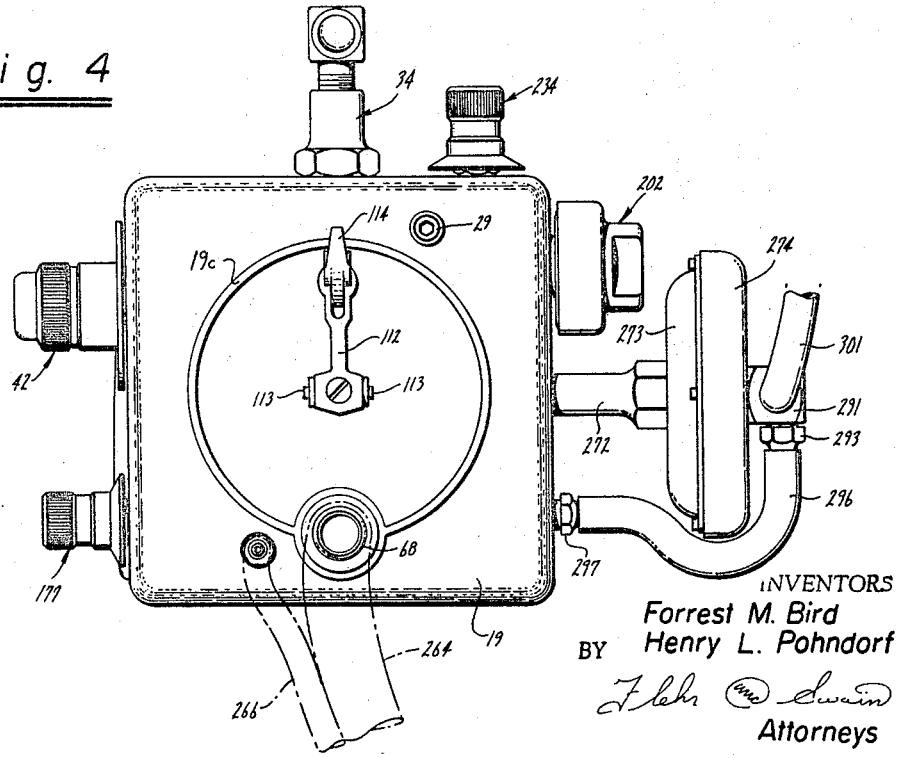
FIGURE 4 is an end elevational view of the right-hand end of the apparatus as viewed in FIGURE 2.

In general, the ventilating apparatus has an inhalation phase and an exhalation phase in its operative cycle. It consists of a controller which has an outlet adapted to be connected to the airway of the patient and an inlet adapted to be connected to a source of gas under pressure. A flow passage is formed in the controller for supplying gas from the inlet to the outlet. Main control valve means is mounted in the controller and is movable between open and closed positions for controlling the flow of gas through the flow passage. In the inhalation phase, the main control valve means is in an open position and permits gas to flow from the inlet to the outlet. In the exhalation phase, the main control valve is closed and prevents the flow of gas from the inlet to the outlet. Means is provided for controlling the movement of the main control valve between open and closed positions. Means is also provided for supplying additional gases to the outlet when the main control valve means does not shift from an open position to a closed position within a predetermined period of time. This last named means includes a fluid source and adjustable metering means for metering the flow of fluid from the fluid source. Automatic flow accelerator valve means is connected to the metering means and receives fluid from the metering means. The flow accelerator valve means includes a valve body having a bore therein and a valve member having an elongate stem slidably disposed in the bore and movable between open and closed positions with respect to the bore. Means is controlled by the flow accelerator valve means for supplying additional gas to the outlet when the valve member is moved to an open position.

As shown in the drawings, the volume limiting ventilating apparatus consists of a controller 11 which is connected to a source of gas 12 under pressure. The controller 11 is also connected to a patient adapter 13 which is adapted to be connected to the airway of the patient.

Controller 11

The controller 11 in many respects is very similar to the controller disclosed in application Ser. No. 57,062, filed Sept. 19, 1960, now Patent No. 3,191,596. It consists of a case or housing 16 which is formed of a main body 17 which is formed of a suitable material such as cast aluminum. As shown in the drawings, it has a generally rectangular configuration. The case 16 also includes a pair of end covers or enclosures 18 and 19, formed of a suitable material such as relatively transparent plastic, mounted on the body 17 to provide enclosed chambers 21 and 22 disposed on opposite sides of the body 17. The chamber 21 can be identified as the atmospheric pressure chamber, whereas the chamber 22 can be identified as the positive pressure chamber. The chamber 21 is vented to the atmosphere through an opening 23 provided in the cover 18. The opening 23 is covered by a filter 24 of suitable material such as porous metal.

Suitable means is provided for securing the end covers 18 and 19 to the main body 17 and consists of a pair of hexagonal rods 26 and 27 and 27a which extend through holes 28 provided in the main body 17 and which are secured to the end covers 18 and 19 by cap screws 29. An O-ring seal 31 is provided between the main body 17 and the cover 19 to ensure that the chamber 22 is leakproof.

The main body is formed with a main flow passage 33 for supplying a gas under pressure from an inlet 34 to an outlet 36. The inlet 34 is in the form of an inlet fitting of a conventional type and is connected by piping 37 to the source 12 of a suitable gas under pressure, such as air or oxygen. The inlet fitting 34 is threaded into the main body 17 and supplies the gas through a filter 38 mounted in the main body 17 to the main flow passage 33. The main flow passage 33 consists of a plurality of separate passages. Thus, as shown particularly in FIGURE 6, it consists of a passage 39 which is formed in the main body 17 and receives gas after it has passed through the filter 38. The passage 39 is connected with another passage 41 extending at right angles thereto and also formed in the body and leads to an initial inspiratory flow valve assembly 42 threaded into the main body 17. The gas passing under pressure through the valve assembly 42 then passes into a flow passage 43 which forms a part of the main flow passage 33 and is also disposed within the main body 17. The passage 43 communicates with an annular recess 44 disposed within the main body 17. Means hereinafter described is provided for establishing communication between the annular recess 44 and the annular recess 45 in the main body 17 and a passage 46 in the body 17. Gas under pressure from the passage 46 is supplied to fittings 47 and 48 threaded into the main body 17. The fitting 47 is connected to a fitting 49 threaded into the rod 27 by tubing 51. The rod 27 is provided with a flow passage 52 which communicates with a fitting 53 mounted on the end of rod 27.

The fitting 48 is connected by tubing 54 to a fitting 56 of an automatic reciprocator cartridge 57 which is mounted on the main body 17. Gas under pressure from the passage 46 is also supplied to a fitting 58 and by tubing 59 to a fitting 61 which forms a part of an accelerator-interrupter cartridge 62 mounted on the main body 17.

*Initial inspiratory flow valve assembly 42*

The valve assembly 42 consists of a valve body 63 which is threaded into a bore 64 provided in the main body 17. Needle valve member 66 is threaded in the body 63 for axial movement of the body. A knob 67 is provided for manual rotation of the valve member 66. As can be seen, the valve member 66 is adapted to meter the flow of fluid from the passage 41 out through an orifice 68 provided in the valve body 63 and into the bore 64 to the passage 43.

*Main control valve means 71*

The controller 11 also includes main control valve means 71 which is movable between open and closed positions for controlling the flow of gas through the main flow passage 33. The control valve means 71 consists of a slide or a shuttle valve 72 which is slidably mounted in a valve sleeve 73 mounted in a bore 74 provided in the body 17. The valve sleeve 73 is provided with a pair of diametrically extending passages 76 and 77. The passage 76 is in communication with the recess 44 and the passage 77 is in communication with the recess 45 provided in the body 17. Seals 78 are disposed in the valve sleeve 73 and make contact with the body 17 to form a sealing engagement between the passages 76 and 77 and the recesses 44 and 45. The shuttle valve 72 is formed with a stepped down diameter to create an annular space 81 which is adapted, when the shuttle valve is in an open position, to bridge the portion of the valve sleeve 73 between the pasages 76 and 77 and to thereby form a communicating passage between the same so that gas can flow directly from the passage 43 through the recess 44 into the passage 76 through the annulus 81 into the passage 77, annular recess 45 and into the passage 46.

Suitable means is provided for moving the shuttle valve 72 between open and closed positions and consists of a diaphragm 84 formed of a suitable flexible material such as rubber. The diaphragm 84 is formed with a relatively planar central portion 84a and an outer portion 84b which is substantially semi-circular in cross-section and integral with the planar portion 84a. The extreme outer annular margin of 84c of the diaphragm is planar and is secured to the body 17 by suitable means such as a clamping ring 86 and screws 87. The diaphragm 84 is disposed opposite an annular recess 88 formed in the body to form an annular chamber 89 between the body and the diaphragm. The inner portion of the diaphragm 84 is secured to the shuttle valve 72 by a suitable means such as by members 91 and 92 which are mounted on opposite sides of the diaphragm 84 and which are mounted upon a shaft 93, centrally disposed in the shuttle valve 72.

As also shown in the drawings, means is provided in the controller for adjustably biasing the main control valve means 71 into a closed position and consists of a pair of permanent magnets 101 and 102 which are generally U-shaped in cross-section as shown in the drawings. The magnet 101 is mounted upon a tubular member 103 which is threaded into the end cover 18 and extends therethrough. Similarly, the magnet 102 is mounted on a member 104 threaded into the end cover 19 and extends therethrough. A seal 106 is also provided between the member 104 and the end cover 19 in view of the fact that chamber 22 is a positive pressure chamber. Attraction plates 107 and 108 are mounted on the shaft 93 and move with the shuttle valve 72. The atraction plate 107 is secured to the member 92, whereas the attraction plate 108 is mounted on the member 109 also carried by the shaft 93 and secured thereto by a nut 111 threaded to the shaft 93. The magnets 101 and 102 and the attraction plates 107 and 108 are in axial alignment.

Means is provided for adjusting the members 103 and 104 axially to thereby adjust the attractive forces supplied to attraction plates 107 and 108 by the magnets 101 and 102 and consists of arms 112 which are secured to the members 103 and 104 by screws 113. Means is provided for retaining the arms 112 in the desired angular position and consists of clamping members 114 which are adapted to engage the outer edge of cylindrical portions 18c and 19c, respectively, of the end covers 18 and 19. The members 114 are movable in a direction parallel to the axis of rotation of the members 103 and 104 and springs 116 are provided between the clamping member 114 and the arm 112 to yieldably urge the clamping member into frictional engagement with the portions 18c and 19c.

A rod 118 is centrally disposed within the tubular member 103 and is secured to the shaft 93 by suitable means such as the ball and socket connection 119 shown in the drawings (see FIGURE 5) to permit manual movement of the shuttle valve 72 between open and closed positions.

Additional means is provided for supporting the tubular members 103 and consists of a sleeve 121 which is carried by a brace 122 and secured to the rods 26 and 27.

*Gas mixing means 126*

The controller 11 is provided with means for supplying a mixture of gas from the inlet 34 and air from the atmospheric compartment 21 through gas mixing means 126 into the positive pressure chamber 22 under the control of the main control valve means 71. The gas mixing means 126 is mounted in the main body 17 and consists of a cylindrical body 127 mounted in a large bore 128 extending through the body 17 between the two compartments 21 and 22. Suitable means is provided for forming a sealing engagement between the body 127 and the body 17 and consists of an O-ring 129 mounted in an annular recess 131 provided in the body 127. A pair of end caps 132 and 133 are threaded on opposite ends of the cylindrical body 127 and engage the body 17 to retain the body 127 in a fixed longitudinal position within the bore 128. The end caps 132 and 133 are provided with openings 134 and 136, respectively, extending therethrough at right angles to the longitudinal axis of the body 127. A venturi-like passage 137 is formed in the body 127 and extends therethrough in a longitudinal direction and is in communication with the openings 134 and 136 provided in the end caps 132 and 133 when check valve means 154 is open. The venturi-like passage 137 is provided with an outwardly flared end 137a. Means is provided for introducing high velocity jets of gases into the inlet of the venturi-like passage 137 and consists of a nozzle 139 which is mounted in the end cap 132. The nozzle 139 is provided with a centrally disposed passage 141 which opens into a centrally disposed orifice 142. The nozzle 139 is provided with a plurality of additional passages 143 which are spaced circumferentially around the central passage 141 and which are inclined inwardly and open into orifices 144 which are circumferentially disposed about the central orifice 142. The passages 143 are in communication with an annular recess 146 which communicates with a fitting 147 mounted on the end cap 132. The passage 141 in the nozzle 139 is connected to a fitting 148 on the accelerator-interrupter cartridge 62 by a tube 149. The fitting 147 is connected to a fitting 151 mounted in the main body 17 by a tube 152.

Check valve means 154 is mounted in the end cap 133 which is adapted to close the outlet end of the venturi-like passage 137. The check valve means 154 consists of a valve member 156 which is provided with a valve stem 157 slidably mounted in the end cap 133 to permit movement of the valve member 156 between open and closed positions. A spring 158 is mounted on the valve stem between the valve member 156 and the end cap 133 and yieldably urges the valve member toward a closed position. The valve member is provided with an annular rim 159 which is adapted to engage an O-ring 160 mounted in the body 127.

*Automatic reciprocator cartridge 57*

The automatic reciprocator cartridge 57 is similar to the device disclosed in copending application Ser. No. 57,062, filed Sept. 19, 1960, now Patent No. 3,191,062, and identified therein as a pneumatic timer. As described in that copending application, the automatic reciprocator cartridge includes a body 161 which is mounted in the main body 17. A plunger rod 162 is slidably mounted in the body 161. An arm 163 is mounted on the plunger rod and is disposed in a plane which is generally parallel to the attraction plate 107. The arm 163 is yieldably retained on the rod 162 by washers 164 and a spring 165. The plunger rod 162 has its other end secured to a diaphragm 166 which has its outer annular margin secured between the body 161 and a cap 167.

Figure 9:
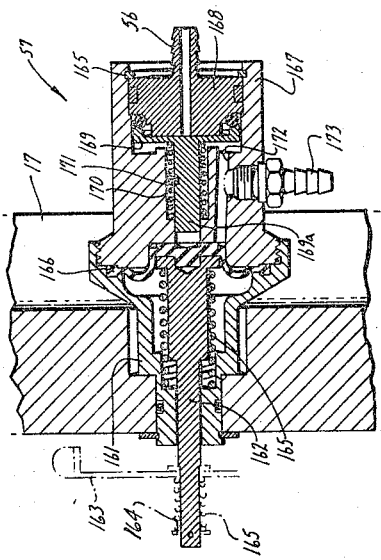
FIGURE 9 is an enlarged cross-sectional view of the automatic reciprocator cartridge.

Means is provided for yieldably urging the shaft 162 to the right as viewed in FIGURE 9 so as to urge the shuttle valve shaft 72 of the main control means 71 into an open position. A plug 168 is mounted in the cap 167 and is provided with the fitting 56 hereinbefore described. A plunger 169 is slidably mounted in the cap 167 and is yieldably urged to the right as viewed in FIGURE 9 by a spring 170, disposed in the bore 171 provided in the cap 167, and coaxially disposed on the stemlike portion 169a of the plunger 169. A passage 172 is provided in the cap 167 and forms a connection between the plunger 169 and one side of the diaphragm 166. The passage 172 also communicates with a fitting 173 threaded into the cap 167. The fitting 173 is connected by a tube 174 to a fitting 175. The fitting 175 is mounted on the main body 17 and communicates with a passage 176 provided in the main body 17. The flow of gas through the passage 176 is controlled by a "controlled expiratory time" valve assembly 177.

*Controlled expiratory time needle valve assembly 177*

The controlled expiratory time needle valve assembly 177 consists of a needle valve 178 threaded into a body 179 which is threaded into the main body 17. Movement of the needle valve 178 is controlled by a knob 181. The needle valve assembly 177 can be identified as being the control for providing a "controlled expiratory time." The body 179 of the needle valve assembly 177 is provided with a small orifice 182 which communicates with the passage 183 provide in the body 17. By adjusting the needle valve assembly 177, it is possible to control the rate of bleed-off of gas from the automatic reciprocator cartridge to thereby determine the amount of time the shaft 162 and the arm 163 carried thereby are retained out of engagement with the attraction plate 107 to thereby permit the shuttle valve shaft 72 or the main control means 71 to remain in a closed position.

*Accelerator-interrupter cartridge 62*

Figure 8:
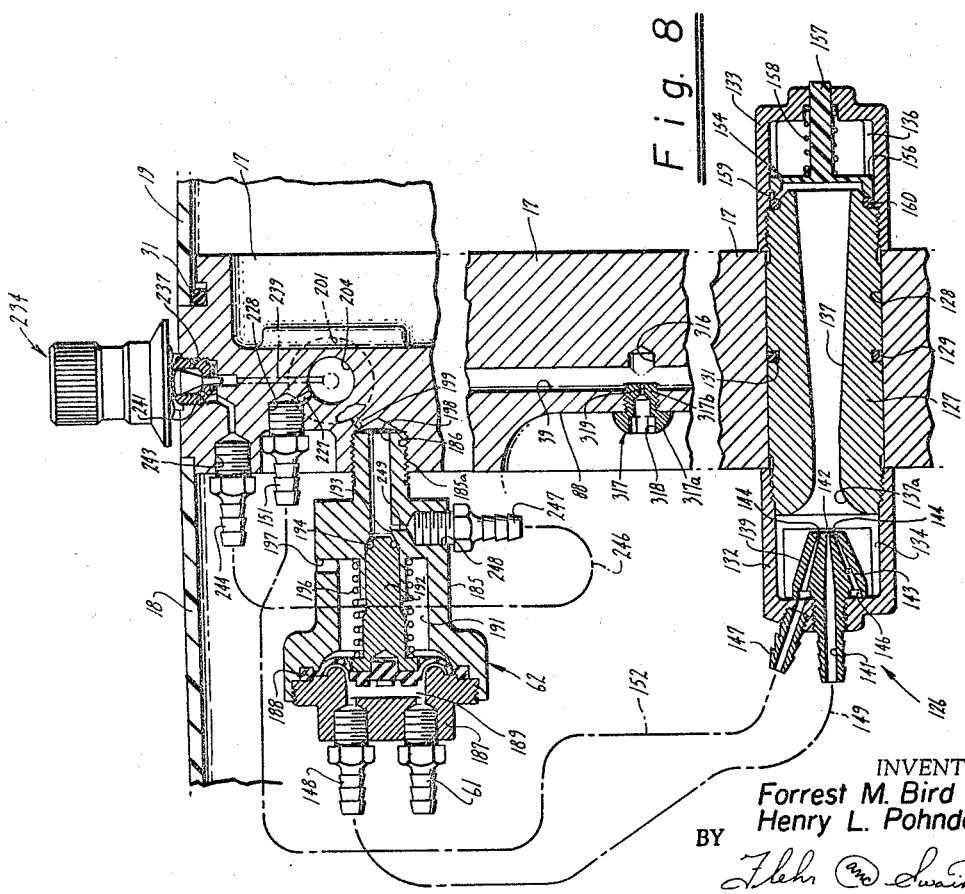
FIGURE 8 is an enlarged cross-sectional view of the accelerator-interrupter cartridge and the gas mixing assembly.

As shown particularly in FIGURE 8, the accelerator-interrupter cartridge 62 consists of a body 185 which is provided with a forward extension 185a which is threaded into a bore 186 in the main body 17. A plug 187 is threaded into one end of the body 185 and carries the fittings 61 and 148. A diaphragm 188 is disposed within the body 185 and has its outer annular margin clamped between the plug 187 and the body 185 as shown in the drawing. The diaphragm 188 serves to form chambers 189, 191 on opposite sides thereof within the body 185 and plug 187. A valve member 192 is slidably mounted within the body 185 and has one end secured to the diaphragm 188. The body 185 is provided with a conical valve seat 193 which is adapted to be engaged by an O-ring 194 carried by the valve member 192. Means is provided for yieldably urging the valve member 192 out of sealing engagement with the seat 193 and consists of a spring 196 disposed axially of the valve member 192 and having one end engaging the valve member and the other end engaging the body 185. The chamber 191 is vented to the atmosphere in the compartment 21 through a port 197. The chamber 191 is also in communication with a passage 198 in the body 185 by virtue of a loose fitting stem 192 within its bore. The passage 198 is in communication with a small passage 199 provided in the main body 17 and entering the bore 186. The passage 199 enters into a bore 201 in which an automatic flow accelerator-cartridge 202 is mounted.

*Automatic flow accelerator cartridge 202*

The automatic flow accelerator cartridge 202 consists of a valve body 203 which is threaded into a bore 201 in the main body 17. The body 203 is provided with a cylindrical extension 203a which is disposed in a smaller bore 204 provided in the body and sealed from bore 201 by an O-ring seal 205. Additional means is provided for establishing another sealing engagement between the body 203 and the bore 201 and consists of an O-ring 206 disposed in an annular recess 207 in the body 203.

The body is formed with connected passages 208 and 208a. Passage 208a is in communication with the passage 199 provided in the main body 17 through the annular space provided between the body 203 and the O-ring seals 205 and 206. The passage 208 communicates with a chamber 209 formed between a diaphragm 211 and the body 203. The outer annular margin of the diaphragm 211 is clamped to the body 203 by a cap 212 which is threaded into the body 203. Another chamber 213 is formed on the other side of the diaphragm 211 between the diaphragm 211 and the cap 212 which is open to the atmosphere through a port 214 provided in the cap 212.

An elongate valve member 216 is slidably mounted in a bore 217 provided in the body 203. O-ring sealing means 218 is mounted in the body 203 and engages the valve member 216. The O-ring sealing means 218 consists of an O-ring 218a mounted on the valve member 216 held in place by a washer 218b which is retained by a spring ring 218c mounted in the body 203. The valve member 216 is fastened to the diaphragm 211 by a washer 219 secured to the valve member 216 on one side of the diaphragm 211 and threaded onto the valve member 216. The valve member 216 is provided with a conical shoulder portion 216a which engages a positive circular line contact seat 222 provided in the valve body 203. The valve member is also provided with a flat or cylindrical portion 216b and very slightly tapered elongate portion 216c which are slidably disposed in a close fitting bore 223 provided in the valve body 203. A "kiss fit" is formed between the portion 216b of the valve member and the bore 223. The bore 223 is in communication with a passage 224 in the main body 17 which is in communication with the main passage 39 also provided in the main body 17. The valve body 203 is also provided with another passage 226 which is in communication with the bore 223 in the valve body 203. The passage 226 is in communication with a small passage 227 in the main body 17 which is in communication with a bore 228 in the main body 17 and in which the fitting 151 is threaded.

Means is provided for yieldably urging the valve member 216 into a position so that its conical shoulder portion 216a is in sealing engagement with the circular seat 222 and so that the portion 216b makes a "kiss fit" in the bore 223 as hereinbefore described and consists of a spring 229 disposed within the cap 212 and having one end mounted on the nut 221 and having the other end engaging a boss 231 provided on the cap 212.

*Terminal inspiratory flow metering valve assembly 234*

Means is provided for metering the flow of gas to the automatic flow accelerator 202 and consists of a terminal inspiratory flow metering valve assembly 234. This valve assembly consists of a valve body 236 which is threaded into a bore 237 provided in the main body 17. A needle valve 238 is threaded into the valve body 236 for axial movement therein and has a knob 240 mounted thereon. As is conventional, the needle valve 238 is adapted to control the flow of fluid from a passage 239 in the main body 17 in communication with the passage 224 through a passage 241 into the bore 237. A passage 242 in the main body 17 opens into the bore 237 and into another bore 243 provided in the main body 17, and in which a fitting 244 is threaded. The fitting 244 is connected to a tube 246 which is also connected to a fitting 247 threaded into a bore 248 of the body 185 of the accelerator-interrupter cartridge 62. A passage 249 is provided in the body 185 and leads from the passage 198 into the bore 186 and thence to passage 199.

*The patient adapter 13*

The patient adapter 13 includes a tracheotomy assembly 256 which is mounted on exhalation valve assembly 262. The tracheotomy assembly consists of a flexible tube 258 which is mounted on the valve assembly 262. The tracheotomy assembly also includes an elbow 259 and a tracheotomy adapter 261. A nebulizer 263 is mounted on the exhalation valve assembly 262. An inlet to the nebulizer is connected by a large tube 264 to the outlet 36. The exhalation valve assembly 262 is also directly connected to the fitting 53 by a smaller tube 266. Gas from the tube 266 is also supplied to a tube 267 connected to the exhalation valve assembly 262 to a fitting 268 provided on the nebulizer 263. The exhalation valve assembly is provided with an exhaust port 269.

The exhalation valve assembly 262 is substantially identical to exhalation valve assemblies shown in copending application Ser. No. 57,062, filed Sept. 19, 1960, now Patent No. 3,191,596. The nebulizer 263 is identical to the nebulizer disclosed in Patent No. 3,172,406. In view of these facts, this portion of the apparatus will not be described in detail. However, it should be appreciated that in place of the tracheotomy assembly 256, an endotracheal tube, mouthpiece, breathing circle system or a face mask can be provided for making connection to the airway of the patient to be treated.

*Volume sensitive control assembly 271*

A volume sensitive control assembly 271 is provided for controlling the operation of the main control valve means 71. It consists of a fitting 272 which is threaded into the main body 17. A pair of cupped members 273 and 274 is mounted upon the fitting 272 as shown in the drawing. The cupped member 273 is threaded onto the outer end of the fitting 272, and the cupped member 274 is secured to the member 273 by suitable means such as screws 276. The outer annular margins of a diaphragm 277 are clamped between the cup-shaped members 273 and 274 as shown. The diaphragm 277 serves to divide the space between the cup-shaped members 273 and 274 into two chambers 278 and 279 on opposite sides of the diaphragm. The chamber 278 is open to the atmosphere through ports 281. A plunger rod 282 is slidably mounted within the fitting 272 and has one end secured to the diaphragm 277 as shown. The other end of the plunger rod 282 is connected to a valve member 283 slidably mounted in the main body 17 and secured to the plunger rod 282 by suitable means such as the ball and socket connection 284 as shown. By movement of the diaphragm 277 as hereinafter described, the valve member 283 is movable into a position in which it occludes a passage 286 leading from the chamber 89 on one side of the diaphragm 84 forming part of the main control valve means 71 to the positive pressure chamber 22. Means is provided for yieldably urging the valve member 283 into a position in which it does not occlude the passage 286 and consists of a spring 287 which is mounted on the plunger rod 282 and has one end engaging the fitting 272 and has the other end engaging the diaphragm 277.

A fitting 291 is mounted on the cup-shaped member 274 and is provided with a passage 292 which opens into the chamber 279. Additional fittings 293 and 294 are mounted upon the fittings 291 and have flow passages therein which communicate with the passage 292. The fitting 293 is connected by a tube 296 to a fitting 297 threaded into a bore 298 in the main body 17. A small passage 299 in the main body 17 opens into the bore 298 and into the positive pressure chamber 22.

The fitting 294 is connected to a tube 301 which is connected to means for metering the thoracic excursions of the patient being ventilated for causing the main valve control means to shift from open to closed positions. This means includes a sentinel valve 302. This sentinel valve consists of a valve body 303. A shuttle valve 304 is slidably mounted within the valve body and is provided with lands 304a and 304b. Means is provided for yieldably urging the shuttle valve to one extreme position, its first closed position, and consists of a spring 306 mounted on the shuttle valve and seated within the valve body 303. The valve body is provided with an exhaust port 307. The valve body 303 is provided with an inlet port 308 which is connected to the tubing 301 and which is normally occluded by the land 304b.

Means is provided for securing the sentinel valve 302 so that it circumscribes the thoracic cage of the patient so that the sentinel valve will sense excursions in the thoracic cage. This means consists of a non-extensible element in the form of a beaded chain 311 which has one end secured to the shuttle valve 304 and has the other end connected to a vernier adjusting device 312 which is connected to the other end of the sentinel valve 302 by a chain 313.

It should be pointed out that the volume sensitive control assembly 271 which includes the sentinel valve 302 is disclosed in copending application Ser. No. 417,564, field Oct. 11, 1964.

Means is provided for continuously bleeding fluid from upstream pressure into the chamber 89 and, as shown in the drawing, consists of a bore 316 which is provided in the main body 17 and extends from the annular chamber 89 to the upstream pressure source 33. A screw-like plug 317 is threaded into the bore 316. The plug 317 is provided with a large bore 318 extending axially thereof from the head 317a to a point just short of the end of the threaded portion 317b. A very small centrally disposed bore 319 is provided in the end of the threaded portion 317b and extends inwardly from the end of the threaded portion to the bore 318. This small bore 319 is relatively small in size as, for example, .009 of an inch.

*Operation*

Operation and use of the volume limiting ventilating apparatus may now be briefly described as follows. Let it be assumed that it is desired to ventilate a patient with the volume limiting apparatus. The sentinel valve 302 is mounted on the patient by placing the chain 311 around the body so that it circumscribes a thoracic circumference at any desired level or position of the body as, for example, around the chest. The chain is properly adjusted during the post expiratory pause by shortening or lengthening the chain and by the use of the vernier adjusting device 312 so that the land 304b is shifted to the right, as shown in FIGURE 2, out of engagement with the port 307. The adjustment, however, is made so that the land 304a is not shifted sufficiently far to the right to occlude the port 307.

After the sentinel valve has been positioned, the patient adapter 13 can be connected to the airway of the patient as, for example, by placing the tracheotomy adapter 261 in the airway of the patient. Let it be assumed that the ventilating apparatus is connected to a source of gas under pressure 12 as shown in FIGURE 1. The gas under pressure will flow through the tube 37, through the inlet 34, the filter 38, through the passages 39 and 41 and into the passage 43 at a rate determined by the position of the initial inspiratory flow valve assembly 42. The gas is supplied from the passage 43 to the annular recess 44 to the passage 76 of the main control valve means 71 through the annular space 81 in the shuttle valve 72, to the passage 77, to the annular recess 45 and to the passage 46 in the main body 17. This occurs as soon as the patient sucks or drains some of the gas within chamber 22 so that the force of the holding magnet 101 is overcome by the force exerted by the diaphragm 84 to shift the shuttle valve 72 to an open position.

The gas under pressure from the passage 46 is supplied to the fitting 58 through the tube 59 to the fitting 61 of the accelerator-interruptor cartridge 62. The gas then flows into the chamber 189 in the accelerator-interruptor cartridge 62 into the fitting 148 through the tube 149, through the passage 141 provided in the end cap 132 of the mixing means 126. This gas is exhausted through the orifice 142 in the form of a jet which enters the venturi-like passageway 137 to thereby cause a reduction of pressure in the chamber 21 so that atmospheric air in the chamber 21 is drawn into the venturi-like passageway 137 and mixed with the gas being discharged from the orifice 142. Thus, if it is assumed that the gas being introduced into the venturi-like passageway 137 from the orifice 142 is oxygen, the oxygen can be utilized for enriching the air which is supplied to the patient. This mixed air under pressure causes opening of the check valve 154 so that the gas is introduced under pressure into the positive pressure chamber 22 from whence it passes into the outlet 36 through the outlet fitting 68, through the large tube 264, the nebulizer 263, the exhalation valve assembly 262, through the tracheotomy adapter 261 to the airway of the patient.

At the same time that gas under positive pressure is being supplied through the outlet 36, gas under a higher pressure is supplied from the passage 46 through fitting 47 (FIGURE 6), through tube 51, fitting 49, passage 52 and rod 27, through fitting 53, tube 266 to the exhalation valve assembly 266 to hold the exhalation valve assembly 262 in a closed position during the inspiratory phase of the controller. This same gas under pressure is also supplied through the tube 267 to a fitting 268 provided on the nebulizer 263 to cause droplets of the medicinal preparation contained within the nebulizer to be nebulized and suspended in the main air stream passing through the nebulizer from the large tube 264 to the airway of the patient.

Gas under positive pressure from the patient breathing circuit is also introduced through passage 299 in the main body 17 into the fitting 297, tube 296, fitting 293, fitting 291, fitting 294, tube 301, to the sentinel valve 302. With the sentinel valve 302 rigged as hereinbefore described, that is, with the land 304b advanced to the right as viewed in FIGURE 2, the port 307 is open and the air passing through tube 301 is permitted to exhaust to the atmosphere. When this is the case, the spring 287 urges the plunger rod 282 and the valve member 283 carried thereby to the right as viewed in FIGURE 6 so that the valve member 283 is out of engagement with the passage 286 provided in the main body 17 so that the chamber 89 is normally vented to the positive pressure chamber 22 and patient breathing circuit.

Under normal conditions, the inspiratory phase continues at a flow rate determined by the setting of the initial respiratory flow control valve assembly 42 until the main control valve means 71 is operated to shift from an open position to a closed position. In the present apparatus, this shifting of the shuttle valve to a closed position is preferably controlled by the volume sensitive control assembly 271 which is normally set so that it will operate at a pressure which is less than the pressure which would be required to be present in the positive pressure chamber 22 to cause the diaphragm 84 to shift the shuttle valve 72 to a closed position. By way of example, the volume sensitive control assembly can be adjusted so that it shifts the main control valve means 71 to a closed position at 17 mm. of Hg. Thus, the controller 11 remains in the inspiratory phase and the mixed gases are supplied to the patient's airway to cause expansion of the lungs and the thoracic or upper abdominal dimension of the patient. This causes the shuttle valve 304 to be shifted to the right as viewed in FIGURE 1 until the land 304a occludes the port 307 to prevent the gas being supplied through tube 301 from being exhausted through the port 307. This causes the controller 11 to be cycled into its exhalation phase by causing a positive pressure to be built up in the chamber 279 to urge the diaphragm 277 to the left as viewed in FIGURE 6. Movement of the diaphragm 277 to the left causes the valve member 283 to be moved into a position so that it occludes passage 286. As soon as the passage 286 is occluded, pressure builds up in the chamber 89 because gas from the direct upstream pressure sources 12 and 33, independent of the patient breathing circuit and downstream pressure, is being continuously bled into the chamber 89 through the very small orifice 319 provided in the screw-like plug 317 (FIGURE 8) from the bore 39 into the chamber 89. Within a very short period of time, sufficient pressure is built up within the chamber 89 to cause the diaphragm 84 to be shifted to the left as viewed in FIGURE 5 to cause the shuttle valve 72 to be moved to the left and from an open to a closed position to prevent the passage of any further gases from the passage 39 to the passage 46 or, in other words, through the main passage 33. As soon as this occurs, gas is no longer supplied to the mixing means 126 so that the check valve 154 is moved to a closed position by the spring 158. As soon as the gas ceases flowing through the passage 46, the gas in tubes 51, 54, 149, 266 and 267 is bled through the nebulizer 263 reducing the pressure in tubes 51, 54, 149, 266 and 267 to ambient, thereby permitting the exhalation valve assembly to move to an open position to permit the patient to exhale through the opening 269 in the exhalation valve assembly 262 and to reduce the positive pressure in chamber 22 and the patient breathing circuit to ambient.

When exhalation by the patient is substantially complete, the sentinel valve 302 senses the decrease in the thoracic dimension of the patient and the shuttle valve 304 shifts to the left as viewed in FIGURE 2 so that the land 304a no longer occludes the port 307. As soon as this occurs, the pressure above the diaphragm 277 is substantially reduced to permit the spring 287 to return the valve member 283 to its normally open position. Chamber 279 is reduced to ambient pressure during exhalation by escapement of gas through passage 299, chamber 22, tube 264, to the exhaust port 269.

As pointed out previously, the magnet 101 is normally adjusted to hold the shuttle valve 72 in a closed position until the patient drains the positive pressure chamber 22 slightly so that atmospheric gas in chamber 21 urges the diaphragm 84 and the shuttle valve 72 to the right as viewed in FIGURE 5 to an open position. This allows a post expiratory pause until the patient initiates the inspiratory phase.

As soon as the shuttle valve 72 has shifted to its normally open position, gas will again flow under pressure into the passage 46 as hereinbefore described to start another respiratory cycle.

From the foregoing description, it can be seen that the sentinel valve 302 has three different positions: (1) a first closed position; (2) an open position; and (3) a second closed position. In the event the chain 311 should break, the sentinel valve 302 will move to its first closed position in which the land 304b occludes the passage 307. However, in such event, the positive pressure within the chamber 22 will increase and this positive pressure will be supplied to the diaphragm 277 and to the airway of the patient so that the patient will receive ventilation up to the normal pressure, e.g., 17 mm. of Hg, by the time that the valve member 283 moves to its closed position to occlude the passage 286 and to cause the shuttle valve 72 to be shifted from an open position to a closed position. This stops the inhalation phase in the same manner as hereinbefore described. The exhalation phase is accomplished in the same manner as hereinbefore described. Thus, it can be seen that the volume sensitive control assembly 271 has been constructed so that it is fail-safe and will still adequately ventilate a patient in the therapeutic range even though the chain 311 should break.

The magnets 101 and 102 serve as means for adjusting the peak or maximum pressure for ventilating the patient up to 90 mm. of Hg, at which the shuttle valve 72 is moved from an open to a closed position by a pressure from the positive pressure chamber 22 through the passage 286 and by pressure on the diaphragm 84. By adjusting the longitudinal position of the magnet 102, the force required for moving the shuttle valve 72 from an open to a closed position can be readily adjusted. This peak pressure is set so that it is higher than normally required to ventilate the patient but not so high as to be dangerous to the patient. The position of magnet 101 will determine the patient effort required to move the shuttle valve 72 to the open position.

The fail-safe feature of the volume sensitive control assembly 271 can be used for switching the ventilating apparatus between an inhalation phase and an exhalation phase at any desired pressure limit adjusted up to the peak pressure of 90 mm. of Hg made available principally through the adjustment of the position of the magnet 102 and by changing the biasing pressure applied by the spring 287 moving the valve member 283 to a normally open position.

When the volume sensitive control assembly 271 is properly adjusted, the patient is unaware of its presence and spontaneous ventilation is completely unimpaired. The volume sensitive control assembly 271 serves as means for sensing the size of the thoracic cage and thereby serves as means for positively limiting the volume to which the thoracic cage can be expanded. Thus, there is no danger of high pressure over-inflation when functional residual capacity is increased during therapy. In addition, there is no failure to deliver preset volumes when variable airway leaks are present.

*Operation of terminal inspiratory flow valve assembly 234, accelerator-interrupter cartridge 62 and automatic flow accelerator 202*

Gas under pressure is supplied from the passage 39 through the passage 224 (FIGURE 6), through passage 239, into the terminal inspiratory flow valve assembly 234 and through a passage 241 at a rate controlled by the adjustment of the valve assembly 234 through a passage 242 (FIGURE 6), through fitting 244, tube 246 to fitting 247 of the accelerator-interrupter cartridge 62. The gas then flows through a passage 249 into a passage 198 of the body 185 into the bore 186 and thence into a passage 199 (FIGURE 8). From passage 199, the gas enters passages 208a and 208 (FIGURE 6) of the automatic flow accelerator 202 into the chamber 209. The gas enters the chamber 209 at a relatively slow rate metered by the terminal inspiratory flow valve assembly 234. As the gas is accumulating in the chamber 209, the diaphragm 211 is shifted slowly to the right as viewed in FIGURE 6 against the force of the spring 229 to gradually move the valve member 216 attached thereto and its integral portions 216a and 216b out of engagement with the valve body 203 to cause the formation of an ever increasing aperture in the shape of an annulus as the valve member 216 is retracted. The flat portion 216b is formed so that there is a smooth transition from static to dynamic flow states.

When sufficient gas molecules have collected within the chamber 209 to apply a force to the diaphragm 211 to overcome the force of the spring 229, a certain amount of time has elapsed so that a desirable breathing curve can be formulated with the controller 11. As the spring 229 is compressed by the movement of the diaphragm 211, the valve member 216 is shifted to the right to gradually increase the size of the aperture to permit gas to flow from the passage 224 in the main body 17 (FIGURE 6) through the passage 223 to a passage 227 provided in the main body 17 (FIGURE 8) to fitting 151 through tube 152 to fitting 147, to the annular recess 146 and to the orifices 144 of the aspirator means 125 to provide a multiplicity of jets of gas converging upon the main jet from the orifice 142 and entering the venturi-like passageway 137 to greatly increase the flow of mixed gases through the venturi-like passageway 137 into the positive pressure chamber 22 and into the outlet 36.

This gradual but greatly increased flow of gases through the outlet 36 continues until the main control valve means 71 is shifted to a closed position either by operation of the volume sensitive control assembly 271 hereinbefore described or by the building up of a positive pressure within the chamber 22 which, applied to the diaphragm 84 through the passage 286, causes the shuttle valve 72 to be shifted to a closed position.

As soon as the shuttle valve 72 is shifted to a closed position, the flow of gases into the passage 46 ceases and gas is no longer supplied to the accelerator-interrupter cartridge through the fitting 61. The gas which remains in the chamber 189 in the accelerator-interrupter cartridge 62 opposite the diaphragm 188 bleeds off through the fitting 61 through the tube 59, the fitting 58, passage 46, fitting 47, tube 51, fitting 49, passage 52 in rod 27, fitting 53, tubing 266, fitting 268, through the jet nozzle provided in the nebulizer 263 and through the exhalation valve of the exhalation valve assembly 263 out the port 269 to the atmosphere. As this occurs, the spring 196 in the accelerator-interrupter cartridge 62 shifts the valve member 192 to the left as viewed in FIGURE 8 away from the valve seat 193 to an open position. When this occurs, the gas being metered by the terminal inspiratory flow valve assembly 234 is bled off to the atmosphere through the port 197 provided in the body of accelerator-interrupter cartridge 62. Thus, it can be seen that during the expiratory phase of the controller 11, the metered gas supplied by the terminal inspiratory flow assembly 234, instead of filling the chamber 209 in the automatic flow accelerator cartridge 202, escapes to the atmosphere instead. Therefore, it can be seen that when the main control valve means 71 is in a closed position, the automatic flow accelerator cartridge 202 is inactive and no gas is supplied to the converging side jets of the aspirator means 126.

After the expiratory phase has been completed, the same sequence of operation hereinbefore described will take place.

The automatic flow accelerator cartridge 202 acts as a relief valve during the exhalation phase and the pause duration before initiation of the inspiratory phase, and thus prevents the formation of the variable preload defect hereinbefore described in conjunction with other respirators, while at the same time it serves as a bypass valve to transmit the gas molecules from the metering valve assembly 234 so that they will only accumulate behind the diaphragm 211 during the inspiratory phase. No preload of gas, therefore, collects in passage 241, bore 237, passage 242, bore 243, fitting 244, tube 246, fitting 247, bore 248 and passage 249.

It can be seen that the terminal inspiratory flow valve assembly 234, the accelerator-interrupter cartridge 62 and the automatic flow accelerator 202 form a time-delayed leak-compensating mechanism in the controller 11. The amount of time delay which occurs before additional gases are supplied to the mixing means 126 can be readily adjusted by the use of the knob 240 on the terminal inspiratory flow assembly 234. Under normal conditions, the leak compensating mechanism may not come into use. It is only when leaks occur so that the thoracic cage is not filled sufficiently to cause operation of the volume sensitive control assembly 271, or if the control assembly 271 is not being used, there is insufficient pressure to cause the diaphragm 84 to shift the shuttle valve 72 to a closed position so that the leak compensating means will come into action and rapidly accelerate the flow of gases into the positive pressure chamber 22 to cause the required thoracic cage expansion or necessary pressure in chamber 22.

The provision of such leak compensating means in the present apparatus is very important because leaks very often occur particularly when the apparatus is used by untrained personnel. It is well known that it is difficult to obtain an air-tight seal between the edges of the face mask and the contours of the cheeks, nose and jaw. By the use of such leak compensating means, the patient is assured of being properly ventilated.

The terminal inspiratory flow assembly 234, the accelerator-interrupter cartridge 62 and the automatic flow accelerator 202 are constructed in such a manner so that they will give fool-proof operation for a long period of time. In particular, the automatic flow accelerator cartridge and accelerator-interrupter cartridge 62 have been constructed so that it is unnecessary to utilize O-rings which rub back and forth on internal bores of mating parts which would cause them to wear out and seize. The kiss-fit provided by the polished stem portion 216b of the valve member 216 will provide trouble-free operation. In view of the fact that the automatic flow accelerator cartridge 202 and the accelerator-interrupter cartridge 62 do not utilize large O-rings which slide in internal bores and use only one stationary seal 218 around a polished stainless steel valve member 216, it is unnecessary to overcome the O-ring friction in moving the valve and for that reason, the diaphragms utilized in the cartridges can be made relatively small and the controller can operate over a relatively much wider range of hospital wall outlet gas pressures. For example, with the design shown in the drawings, the controller functions very well even at a source pressure as low as 22 lbs. per sq. in.

*Operation of controlled expiratory time valve assembly 177 and automatic reciprocator cartridge 57*

The controlled expiratory time valve assembly 177 and the automatic reciprocator cartridge 57 are provided primarily for anesthesia applications but also may be used wherever expiratory time should be controlled. It is used, for example, when the patient has lost consciousness or the ability to breathe voluntarily.

In operation, gases under pressure are supplied through the passage 46, fitting 48, tube 54 to the fitting 56. This causes the plunger 169 to be urged to the left against the force of the spring 170 as viewed in FIGURE 9 so that it is in an open position and permits the gas to flow from the inlet fitting 56 through the passage 172 to apply positive pressure to the diaphragm 166 and to urge it completely to the left against the force of the spring 165 as viewed in FIGURE 9. This gas under pressure is continuously supplied to the automatic reciprocator cartridge 57 during an inspiratory phase of the controller 11. The gas continuously bleeds off at a controlled rate through the fitting 173, tube 174, fitting 175 to the controlled expiratory time valve assembly 177 and through the passage 183 into the positive pressure chamber 22. As soon as the exhalation phase is initiated as hereinbefore described, gas under pressure is no longer supplied to the fitting 56 and the plunger 169 is shifted to the right under the force of the spring 170. Gas, however, continues to bleed off through the passage 172, through the valve assembly 177 and through the passage 183 within a time determined by the rate of flow through the controlled expiratory time valve assembly 177, the shaft 162 with the arm 163 is shifted to the right as viewed in FIGURES 5 and 9 to engage the attraction plate 107 and to shift the shuttle valve 72 from a closed to an open position. This causes gas under pressure to be supplied to the passage 46 to start the same cycle hereinbefore described.

From the foregoing, it can be seen that the automatic reciprocator cartridge, in conjunction with the controlled expiratory valve assembly 177, serves as means for automatically cycling the air on for the patient being treated.

It should be appreciated that normally the automatic reciprocator cartridge does not come into operation because it is normally adjusted so that the patient controls the breathing rate rather than the controller 11. As explained previously, the patient can control the breathing rate by operation of the volume sensitive control assembly 271 or by causing operation of the main control valve 72 directly by pressures on the diaphragm 84. Thus, the automatic reciprocator cartridge ordinarily does not take the timing of the breathing away from the patient but only does so if he does not breathe within a predetermined time as set by the valve assembly 177.

It is apparent from the foregoing that we have provided a new and improved volume limiting ventilating apparatus which has many advantageous features and which, in particular, has eliminated the use of any parts which can wear out or seize.

We claim:

1. In a ventilating apparatus having an inhalation phase and an exhalation phase in its operative cycle, a controller having an inlet adapted to be connected to a source of gas under pressure, said controller having an outlet adapted to be connected to the airway of the patient, a main control valve in the controller movable between open and closed positions to control the flow of gas from the inlet to the outlet, means for operating said main control valve so that the main control valve is in an open position in the inhalation phase and in a closed position in the exhalation phase of the ventilating apparatus, and means for supplying additional gases to the outlet when the main control valve does not shift from an open position to a closed position within a predetermined period of time, said last named means including a fluid source, adjustable metering means for metering the flow of fluid from said fluid source, automatic flow accelerator valve means connected to said metering means and adapted to receive fluid from the metering means, said flow accelerator valve means including a valve body having a bore therein and a valve member having an elongate stem slidably disposed in the bore and movable between open and closed positions with respect to the bore, and means connected to said automatic flow accelerator valve means for supplying additional gas to the outlet as the valve member is moved to an open position.

2. Apparatus as in claim 1 wherein said valve stem forms a "kiss-fit" in the bore in the valve body and wherein said valve body is formed with a passage out of communication with said bore when said valve member is in a closed position and being in communication with said bore when said valve member is moved to an open position.

3. Apparatus as in claim 1 wherein said automatic flow accelerator valve means also includes a flexible diaphragm secured to the valve body and also secured to the valve member and wherein the fluid under pressure is bled into a region between the valve body and the diaphragm to gradually urge the valve member from a closed to an open position.

4. Apparatus as in claim 1 together with valve means controlled by the main control valve for exhausting said fluid metered by said adjustable metering means to the atmosphere during the time the controller is in its exhalation phase.

5. Apparatus as in claim 4 wherein said last named valve means consists of an accelerator-interrupter valve assembly comprising a valve body, said valve body being formed with a bore and a port in communication with said bore, a valve member slidably mounted in said bore and movable between open and closed positions with respect to said port, a diaphragm mounted in said body and secured to said valve member, and means for supplying fluid under pressure to said diaphragm during the inspiratory phase of the controller to retain the valve member in a closed position.

6. In a ventilating apparatus having an inhalation phase and an exhalation phase in its operative cycle, a controller having an inlet adapted to be connected to a source of gas under pressure, said controller having an outlet adapted to be connected to the airway of the patient, a main control valve in the controller movable between open and closed positions to control the flow of gas from the inlet to the outlet, means for operating said main control valve so that the main control valve is in an open position during the inhalation phase and in a closed position in the exhalation phase of the ventilating apparatus, means for supplying additional gases to the outlet when the main control valve does not shift from an open position to a closed position within a predetermined period of time, said last named means including a fluid source, adjustable metering means for metering the flow of fluid from said fluid source, automatic flow accelerator means, means connecting said automatic flow accelerator means to said adjustable metering means to supply fluid to said accelerator valve means, said accelerator valve means including a valve body having a bore therein in communiction with said inlet, a valve member movable between open and closed positions with respect to said bore for supplying additional gas to the outlet, and means carried by the valve member adapted to be engaged by the fluid metered by said adjustable metering means to move said valve member to an open position within a predetermined time, said means for connecting said automatic flow accelerator valve means to said adjustable metering means including means for exhausting the fluid metered by the adjustable metering means to the atmosphere during the time that the controller is in its exhalation phase.

7. A ventilating apparatus as in claim 6 wherein said means for connecting the automatic flow accelerator means to the adjustable metering means includes accelerator-interrupter valve means consisting of a body, said body having a passage and a port in communication with said passage, a valve member slidably mounted in said body and adapted to be moved between a closed position in which it interrupts the communication between said port and said passage and an open position in which it permits communication between said port and said passage, means connecting said adjustable metering means to said passage in said body so that the metered fluid passes through said passage, and means forming a connection between said passage and said automatic flow accelerator valve means and means for shifting said valve member into a position so that it interrupts the communication of said passage with said port only during the inhalation phase of the controller.

8. Apparatus as in claim 7 wherein said means for moving said valve member into position so that it only interrupts the communication between said port and said passage during the inhalation phase of the controller includes diaphragm means carried by the valve member and means controlled by the main control valve for supplying the gas under pressure to one side of the diaphragm means during the inhalation phase of the controller.

9. In a ventilating apparatus having an inhalation phase and an exhalation phase in its operative cycle, a controller having an inlet adapted to be connected to a source of gas under pressure, said controller having an outlet adapted to be connected to the airway of the patient, a main body in said controller and having a main flow passage in communication with said inlet and said outlet, a main control valve mounted in said body and movable between open and closed positions to control the flow of gas through said passage and from the inlet to the outlet, means for operating said main control valve so that the main control valve is in an open position in the inhalation phase and in a closed position in the exhalation phase of the ventilating apparatus, and means for supplying additional gases to the outlet when the main control valve does not shift from an open position to a closed position within a predetermined period of time, said last named means including a fluid source, adjustable metering means for metering the flow of fluid from the fluid source, accelerator-interrupter valve means consisting of a first valve body having a first bore therein, said first valve body also having a first passage in communication with said first bore and a first port in communication with said first bore, a first valve member slidably mounted in said first bore and adapted in a closed position to interrupt the communication between said first passage and said first port and in an open position permitting communication between said first passage and said first port, first diaphragm means carried by said first valve member, means mounted in said first valve body and yieldably urging said first valve member towards an open position, means controlled by the main control valve for supplying gas from the inlet to the first diaphragm means to urge the first valve member into a closed position against the force of the yieldable means, means forming a connection between said first passage in said first valve body to said adjustable metering means, automatic flow accelerator valve means, said automatic flow accelerator valve means consisting of a second valve body, said second body having a second bore therein and a second port in communication with said second bore, a second valve member slidably mounted in said second valve body movable between open and closed positions and in a closed position providing communication between said second port and said second bore and in an open position permitting communication between said second port and said second bore, means connecting said second bore to said inlet, second diaphragm means carried by the second valve member and mounted in said second valve body, means for supplying fluid from said first passage in said first valve body to said second diaphragm means of said automatic flow accelerator valve means, means mounted in the valve body of said automatic flow accelerator valve means and yieldably urging the second valve member into a closed position, said metered fluid serving to move said second valve member into an open position against the force of the last named yieldable means so that said second bore is in communication with said second port, and means for supplying the additional gas from said second port to said outlet.

10. Apparatus as in claim 9 wherein said accelerator-interrupter valve means includes a smooth bore and wherein the portion of said valve member slidably mounted in said bore is provided with a smooth continuous surface.

11. Apparatus as in claim 9 wherein said automatic flow accelerator valve means has a smooth bore and wherein said valve member is provided with an elongate stem slidably mounted in said bore and having a smooth continuous surface forming a "kiss-fit" in the bore.

References Cited
UNITED STATES PATENTS

| | | | |
|---|---|---|---|
| 2,830,580 | 4/1958 | Saklad et al. | 128—145.8 |
| 2,881,757 | 4/1959 | Haverland | 128—145.8 |
| 3,191,596 | 6/1965 | Bird et al. | 128—145.5 |
| 3,265,061 | 8/1966 | Gage | 128—145.8 |

RICHARD A. GAUDET, *Primary Examiner.*

K. L. HOWELL, *Assistant Examiner.*